(No Model.)

J. T. CLARKSON.
JUMP SEAT.

No. 300,847. Patented June 24, 1884.

Witnesses:
Ralph E. Clarkson.
Jas. H. Taylor

Inventor:
Joseph T. Clarkson

N. PETERS. Photo-Lithographer. Washington, D. C.

UNITED STATES PATENT OFFICE.

JOSEPH T. CLARKSON, OF AMESBURY, ASSIGNOR OF ONE-HALF TO FRANK A. BABCOCK, OF SALISBURY, MASSACHUSETTS.

JUMP-SEAT.

SPECIFICATION forming part of Letters Patent No. 300,847, dated June 24, 1884.

Application filed September 4, 1883. (No model.)

*To all whom it may concern:*

Be it known that I, JOSEPH T. CLARKSON, a citizen of the United States, and residing at Amesbury, in the county of Essex and State of Massachusetts, have invented a new and useful Improvement in Jump-Seats, of which the following is a specification.

The object of my invention is to provide a folding or turn-down seat and a sliding seat, arranged to be automatically and simultaneously actuated when it is desired to render but one or both seats available for use, said invention, while available for use in a four-wheeled vehicle, being more especially useful in those with two wheels; and it consists in the construction and combination of the divers devices embodied therein, as is hereinafter more particularly and fully set forth and claimed.

Figure 1:
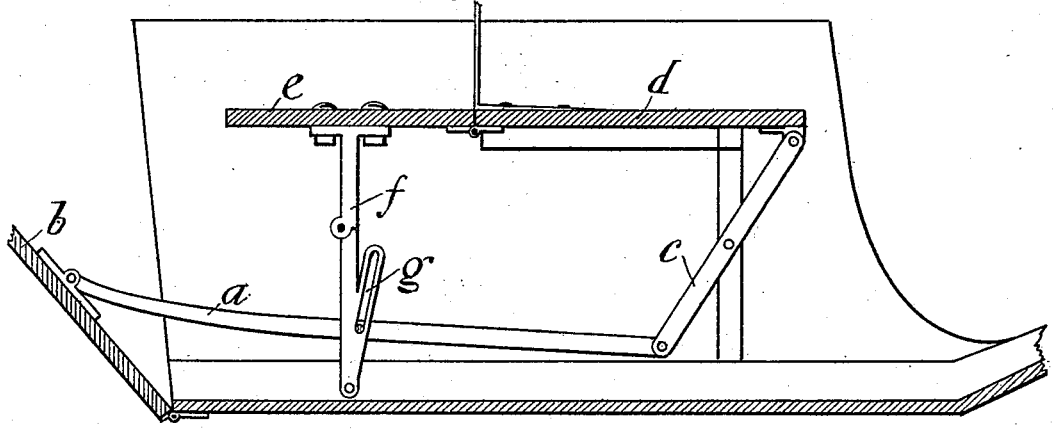
Figure 2:
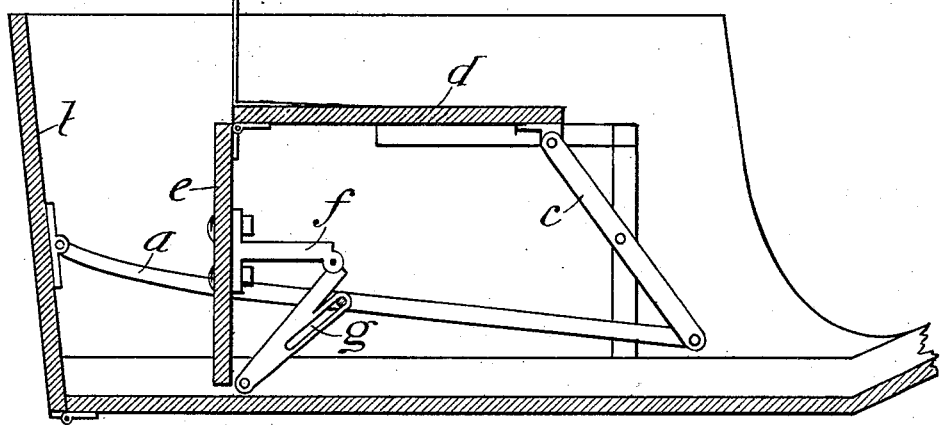

In the accompanying drawings, Figure 2 is an elevation showing the interior of the left-hand or "near" side of a carriage-body as viewed from the opposite or "off" side, with my improvement thereto applied, and showing the front seat in position for use, with the rear seat turned down. Fig. 1 is a view similar to Fig. 2, but showing both seats in position for use, the seat controlling and actuating devices which are shown in said views being duplicated upon the opposite or off side of the carriage in the usual manner of such vehicles.

In said views, $b$ represents the tail-board of the carriage-body, said board being hinged at its lower edge to the body in the usual well-known manner. When the front and rear seats are both arranged for use, this tail-board serves as the foot-board of the occupants of the rear seat. The front seat, $d$, is arranged to slide on ledges secured to the sides of the body, in the usual manner of sliding-seat carriages. Said seat $d$ is connected with tail-board $b$ by means of lever $c$, which, at or near its center, is pivotally connected with and supported by the side of the body, its upper end being pivotally connected with said seat, while its lower end is in a similar manner connected with connecting-rod $a$, which latter at its rear end is pivoted to said tail-board, as shown, at such distance above its hinged edge as will allow the requisite movement of the board when opened. The rear seat, $e$, is at its front edge hinged to the rear edge of seat $d$, while near its center (as viewed) a jointed standard, $f$, is at its upper end rigidly secured to it, the lower end of said standard being pivotally attached to the floor of the body, an oblique slotted member, $g$, of said standard being engaged by a pin secured in rod $a$, which pin moves vertically in the slot in $g$ when the devices are actuated. A lazy-back adapted to serve equally the occupants of both seats is permanently attached to the rear part of the front seat, as shown.

In practical use the closing of tail-board $b$ forces rod $a$ forward, thereby actuating pivotal lever $c$ and moving front seat, $d$, rearward. At the same time the pin in rod $a$ deflects standard $f$ forward, thereby turning down seat $e$, all as shown in Fig. 2, while the opening of said tail-board will, by a reverse action of rod $a$ and lever $c$, slide seat $d$ forward, the standard $f$ being at the same time brought into an upright position, thereby raising seat $e$ to a level with seat $d$, the tail-board being locked in position by its said connection with said standard $f$, which, being formed with the well-known "rule-joint," can only move to an upright position when its central part is moved rearward. When tail-board $b$ is closed, it serves to lock seat $d$ in place, as said seat can be jumped neither forward nor back without raising its front edge, which movement is prevented by the weight of the occupants when in use. By means of the forward and back movement of the front seat the equilibrium of even a two-wheeled vehicle is preserved, notwithstanding the change from a double to a single seated carriage.

I claim as my invention—

1. The combination of pivotal tail-board $b$, rod $a$, pivotal lever $c$, and sliding seat $d$, substantially as specified.

2. The combination of hinged tail-board $b$, rod $a$, pivotal lever $c$, sliding front seat, $d$, hinged seat $e$, and jointed standard $f$, all arranged to operate substantially as specified.

3. The combination of a sliding front seat and a rear turn-down seat, thereto hinged, with automatic devices arranged to simultaneously actuate said seats, substantially as specified.

4. The combination of sliding front seat, d, rear seat, e, hinged thereto, jointed standard f, arranged to actuate and support seat e, and rod a, connected with tail-board b and said standard, and arranged to thereby actuate said rear seat as the tail-board is opened and closed, substantially as specified.

5. The combination of a hinged tail-board, a sliding front seat, a rear turn-down seat hinged to such front seat, with devices connecting said tail-board and seats, whereby the opening and closing of said tail-board will actuate said seats in the manner described.

6. The combination of a sliding front seat and a rear seat hinged thereto and arranged to be vibrated upward and downward upon its hinges as the front seat is slid backward and forward, substantially as specified.

7. The combination of a sliding front seat, a rear seat thereto hinged, a jointed standard arranged to actuate and support said rear seat, a pivoted vibrating lever arranged to actuate and lock said front seat, and a rod connected with both said standard and lever, and arranged to thereby actuate both said seats, substantially as specified.

JOSEPH T. CLARKSON.

Witnesses:
JAS. W. TAYLOR,
RALPH E. CLARKSON.